(12) United States Patent
Chang (10) Patent No.: US 11,870,385 B2
(45) Date of Patent: Jan. 9, 2024

(54) LINEAR MOTORS WITH EMBEDDED ENCODER

(71) Applicant: ARCUS TECHNOLOGY, INC., Livermore, CA (US)

(72) Inventor: Christopher C. Chang, Pleasanton, CA (US)

(73) Assignee: Arcus Technology, Inc., Livermore, CA (US)

( * ) Notice: Subject to any disclaimer, the term of this patent is extended or adjusted under 35 U.S.C. 154(b) by 0 days.

(21) Appl. No.: 17/673,596

(22) Filed: Feb. 16, 2022

(65) Prior Publication Data

US 2022/0263439 A1 Aug. 18, 2022

Related U.S. Application Data

(60) Provisional application No. 63/150,417, filed on Feb. 17, 2021.

(51) Int. Cl.
*H02K 41/035* (2006.01)
*H02K 41/00* (2006.01)
*H02K 41/02* (2006.01)
*H02P 7/025* (2016.01)

(52) U.S. Cl.
CPC ......... *H02P 7/025* (2016.02); *H02K 41/0356* (2013.01)

(58) Field of Classification Search
CPC ..... H02K 41/0356; H02K 41/00; H02K 41/02
USPC .................. 310/12.16, 12.19, 68 B
See application file for complete search history.

(56) References Cited

U.S. PATENT DOCUMENTS 5,536,983 A * 7/1996 Araki .................. H02K 41/033
318/135

FOREIGN PATENT DOCUMENTS

| CN | 206975303 U | * | 2/2018 |
| JP | 06054516 A | * | 2/1994 |
| JP | 2008141929 A | * | 6/2008 |

* cited by examiner

*Primary Examiner* — Jose A Gonzalez Quinones
(74) *Attorney, Agent, or Firm* — LOZA & LOZA, LLP; Thomas H. Ham (57) ABSTRACT

A linear motor includes a magnetic assembly and a coil assembly having at least one coil positioned to magnetically engage the magnetic assembly for linear displacement between the magnetic assembly and the coil assembly. The linear motor further includes an encoder strip attached to one of the magnetic assembly and the coil assembly and an encoder reader attached to the other one of the magnetic assembly and the coil assembly to read the encoder strip during the linear displacement between the magnetic assembly and the coil assembly.

8 Claims, 11 Drawing Sheets

LINEAR MOTORS WITH EMBEDDED ENCODER

CROSS REFERENCE TO RELATED APPLICATION

This application is entitled to the benefit of U.S. Provisional Patent Application Ser. No. 63/150,417, filed on Feb. 17, 2021, which is incorporated herein by reference.

BACKGROUND OF THE INVENTION

Two commonly used linear motors include direct current (DC) voice coil linear motors and 3 phase linear motors. These types of motors are usually servo controlled and require linear encoders. The use of conventional linear encoders in these motors may significantly increase the size of the assembled mechanism, e.g., a voice coil assembly, with the linear motor and the linear encoder.

Figure 1:
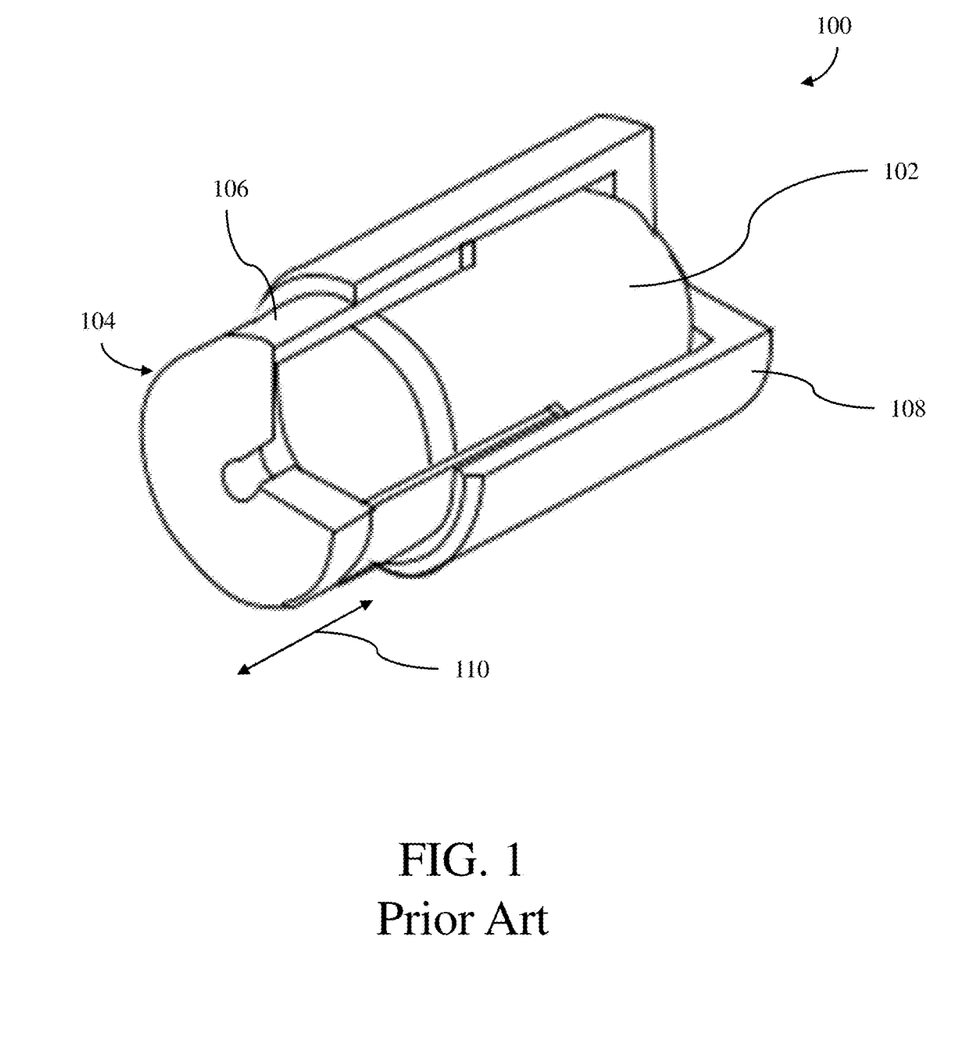
FIG. 1 is a diagram of a linear voice coil motor in accordance with the prior art.

Voice coil motors are low lost and ideal for short stroke (typically 25 mm or less) motion application. An example of a typical voice coil motor 100 in accordance with the prior art is shown in FIG. 1. As illustrated, the voice coil motor 100 includes a permanent magnet 102, a coil assembly 104 with a coil 106 and an outer housing 108. When current is applied to the coil 106, the coil assembly 104 will be linearly displaced with respect to the permanent magnet 102 in either direction as indicated by the arrow 110 depending on the polarity of the current flow.

Figure 2:
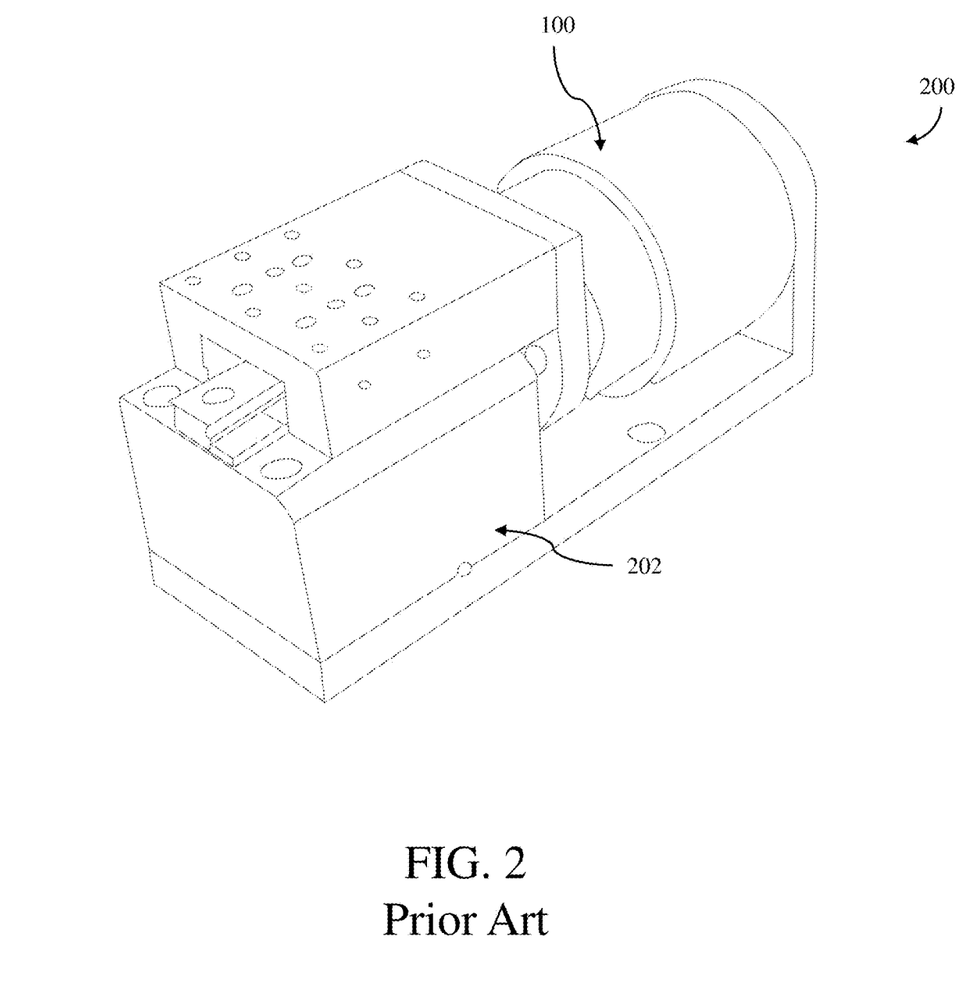
FIG. 2 is a diagram of a voice coil stage, which includes the linear voice coil motor shown in FIG. 1, without a linear encoder in accordance with the prior art.

A voice coil motor may be included in a voice coil stage. An example of a fully assembled voice coil stage 200 in accordance with the prior art is shown in FIG. 2. As illustrated, the voice coil stage 200 includes a voice coil motor 100 installed in a linear carriage system 202. The voice coil stage 200 does not include a linear encoder.

Figure 3:
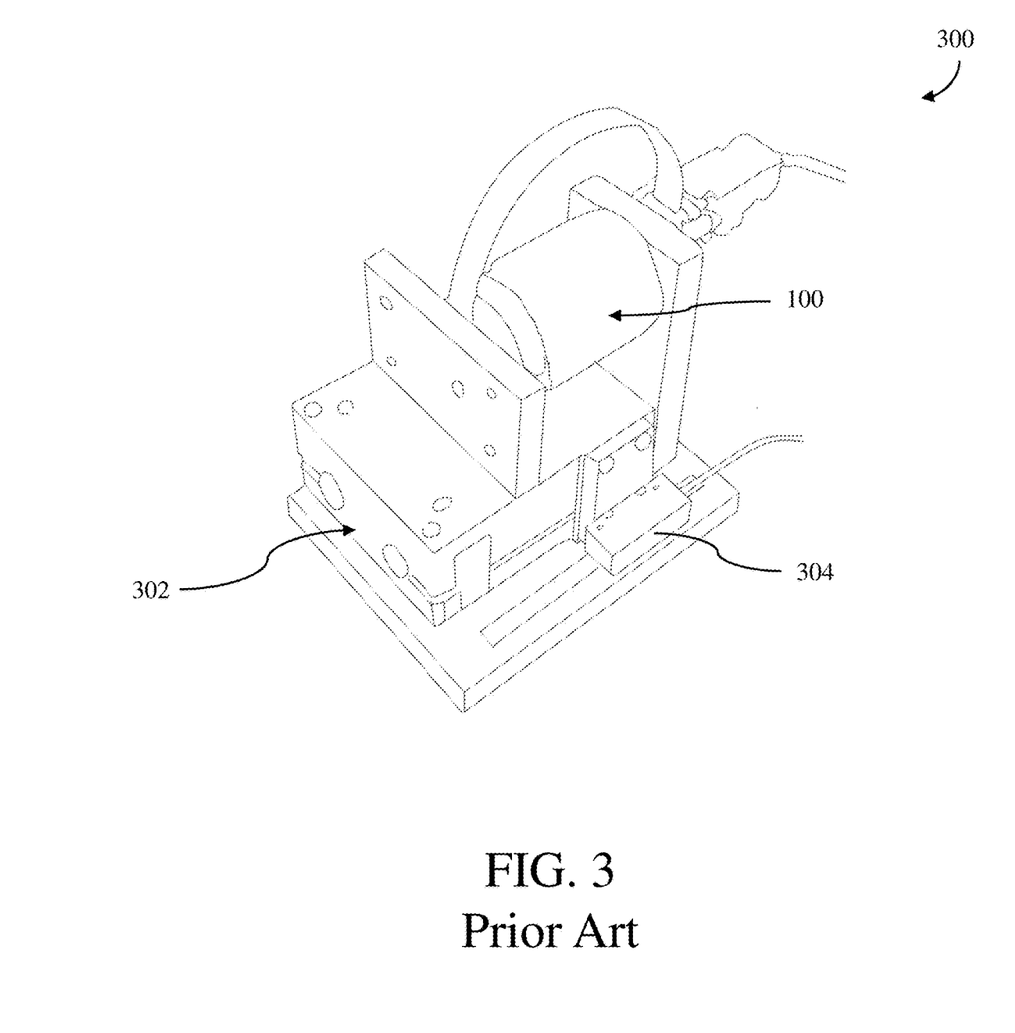
FIG. 3 is a diagram of a voice coil stage, which includes the linear voice coil motor shown in FIG. 1, with a linear encoder in accordance with the prior art.

An example of a fully assembled voice coil stage 300 with a linear encoder 304 in accordance with the prior art is shown in FIG. 3. As illustrated, the voice coil stage 300 includes a voice coil motor 100 installed in a linear carriage system 302. The linear encoder 304 is attached to the side of the linear carriage system 302.

A concern with the conventional voice coil stage shown in FIG. 3 is that the linear encoder 304 takes up additional space on the linear carriage system 302, increasing the overall size of the voice coil stage. In addition, the cost of the linear encoder is typically much higher than the linear voice coil motor. For example, the cost of the linear encoder may be four to ten times greater than the cost of the linear voice coil motor, depending on the encoder type, i.e., magnetic or optical, and the resolution of the linear encoder.

SUMMARY OF THE INVENTION

A linear motor in accordance with an embodiment of the invention include a magnetic assembly and a coil assembly having at least one coil positioned to magnetically engage the magnetic assembly for linear displacement between the magnetic assembly and the coil assembly. The linear motor further includes an encoder strip attached to one of the magnetic assembly and the coil assembly and an encoder reader attached to the other one of the magnetic assembly and the coil assembly to read the encoder strip during the linear displacement between the magnetic assembly and the coil assembly.

A linear voice coil motor in accordance with an embodiment of the invention includes a stationary magnetic assembly, a coil assembly having at least one coil positioned to magnetically engage the stationary magnetic assembly for linear displacement of the coil assembly relative to the stationary magnetic assembly, an encoder strip attached to the coil assembly, and an encoder reader attached to the stationary magnetic assembly to read the encoder strip when the coil assembly is linearly displaced.

A linear motor in accordance with an embodiment of the invention includes a stationary magnetic assembly, a forcer having at least one coil positioned to magnetically engage the magnetic assembly for linear displacement of the forcer along the length of the stationary magnetic assembly, an encoder strip attached to the stationary magnetic assembly, and an encoder reader attached to the forcer to read the encoder strip during the linear displacement of the forcer relative to the stationary magnetic assembly.

Other aspects and advantages of the present invention will become apparent from the following detailed description, taken in conjunction with the accompanying drawings, illustrated by way of example of the principles of the invention.

DETAILED DESCRIPTION

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 4:
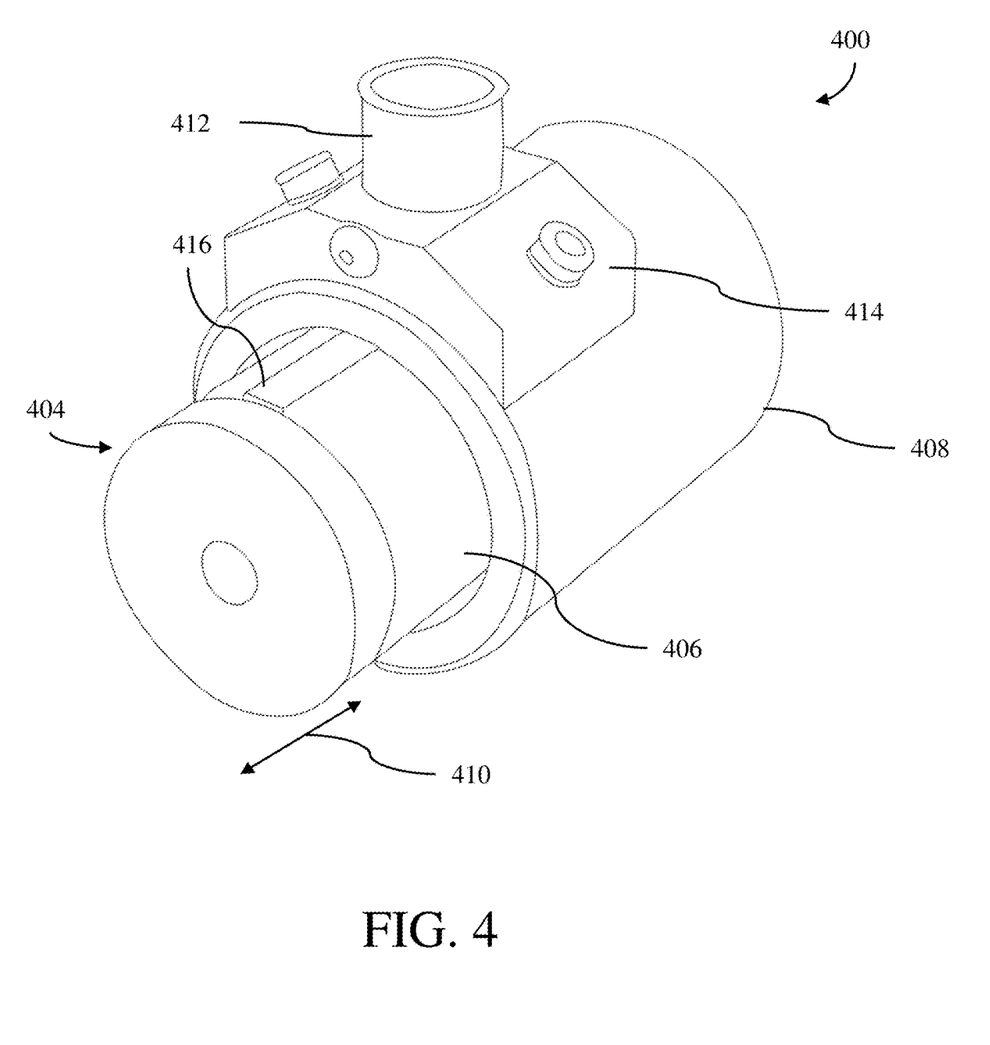
FIG. 4 is a diagram of a linear voice coil motor with a linear encoder in accordance with an embodiment of the invention.

Turning now to FIG. 4, a linear DC voice coil motor 400 in accordance with an embodiment of the invention is shown. Similar to a conventional DC voice coil motor 100, the linear voice coil motor 400 includes a permanent magnet (not shown in FIG. 4 but similar to the permanent magnet 102 shown in FIG. 1), a coil assembly 404 with a coil 406 and an outer housing 408. The outer housing 408 and the permanent magnet, which is positioned within the coil 406 of the coil assembly 404, are coupled together to form a magnetic assembly of the linear voice coil motor 400. Thus, the coil 406 of the coil assembly 404 is positioned to magnetically engage the permanent magnet of the magnetic assembly for linear displacement of the coil assembly with respect to the magnetic assembly, which is stationary in the illustrated embodiment. In some embodiments, the permanent magnet may be a single magnet structure or a multi-magnet structure. In additional, the linear voice coil motor 400 includes a linear encoder comprised of an encoder reader 412 mounted to the outer housing 408 on an encoder reader bracket 414. The encoder reader 412 is positioned to read an encoder strip 416 attached to the coil 406 of the coil assembly 404.

Figure 5:
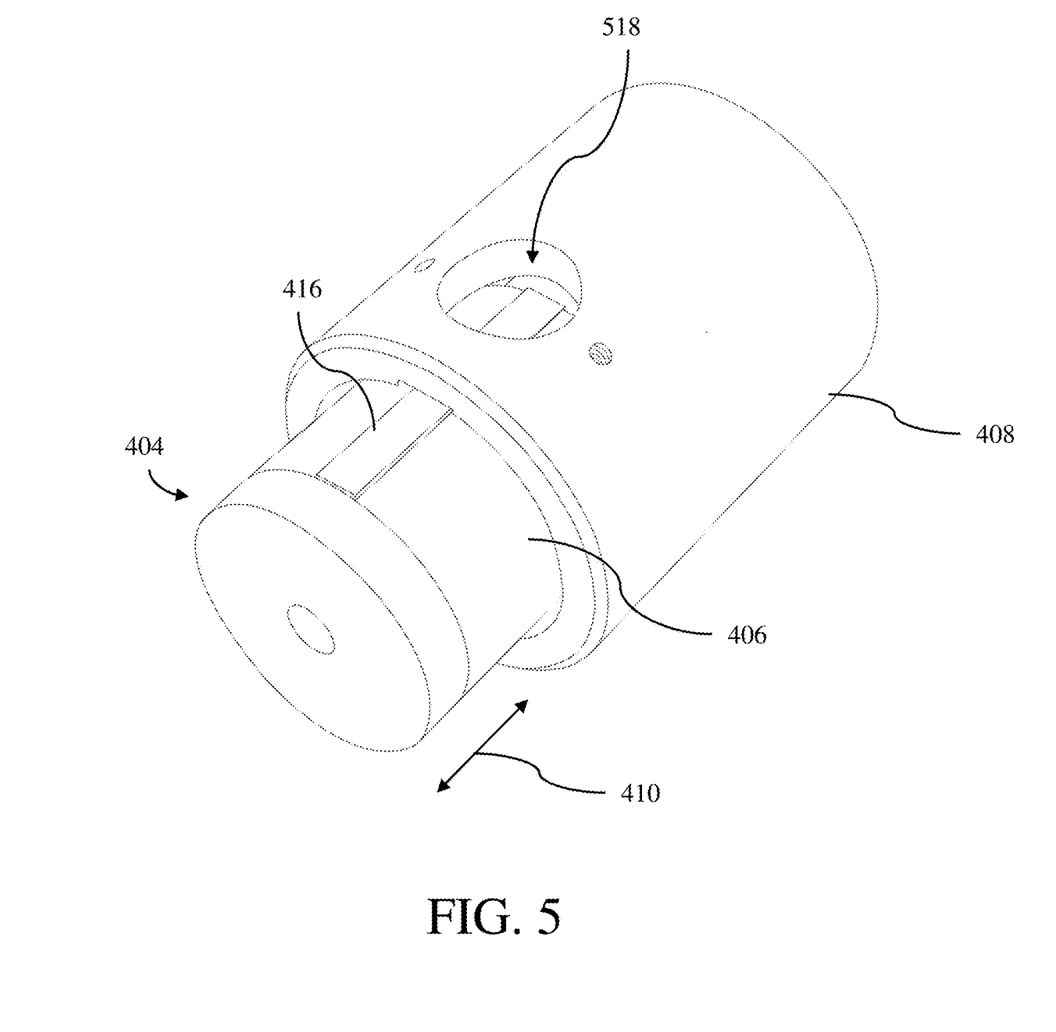
FIG. 5 is a diagram showing an opening in an outer housing of the linear voice coil motor shown in FIG. 4 in accordance with an embodiment of the invention.

The encoder reader 412 may be an optical encoder reader or a magnetic encoder reader. If the encoder reader 412 is an optical encoder reader, the encoder strip 416 may be a reflective encoder strip with lines or grating. In addition, as illustrated in FIG. 5, the outer housing 408 may include a hole or an opening 518 so that the encoder reader 412 can transmit light to and receive reflected light from the encoder strip 416 through the outer housing. If the encoder reader 412 is a magnetic encoder reader, the encoder strip 416 may be a magnetic encoder strip with alternating sections of north (N) and south (S) poles. In this magnetic encoder reader embodiment, the outer housing 408 may or may not include a hole or an opening, e.g., the hole 518 shown in FIG. 5, to magnetically sense the encoder strip 416.

In operation, when current is applied to the coil 406, the coil assembly 404 will be linearly displaced with respect to the magnetic assembly of the linear voice coil motor 400 that includes the outer housing 408 connected to the magnet structure in either direction as indicated by the arrow 410 depending on the polarity of the current flow. During the linear displacement of the coil assembly 404, the encoder reader 412 will read the encoder strip 416 to determine one or more displacement information, such as position and speed. In some configurations, the magnet structure may be displaced with respect to the coil 406 of the coil assembly 404.

Figure 6:
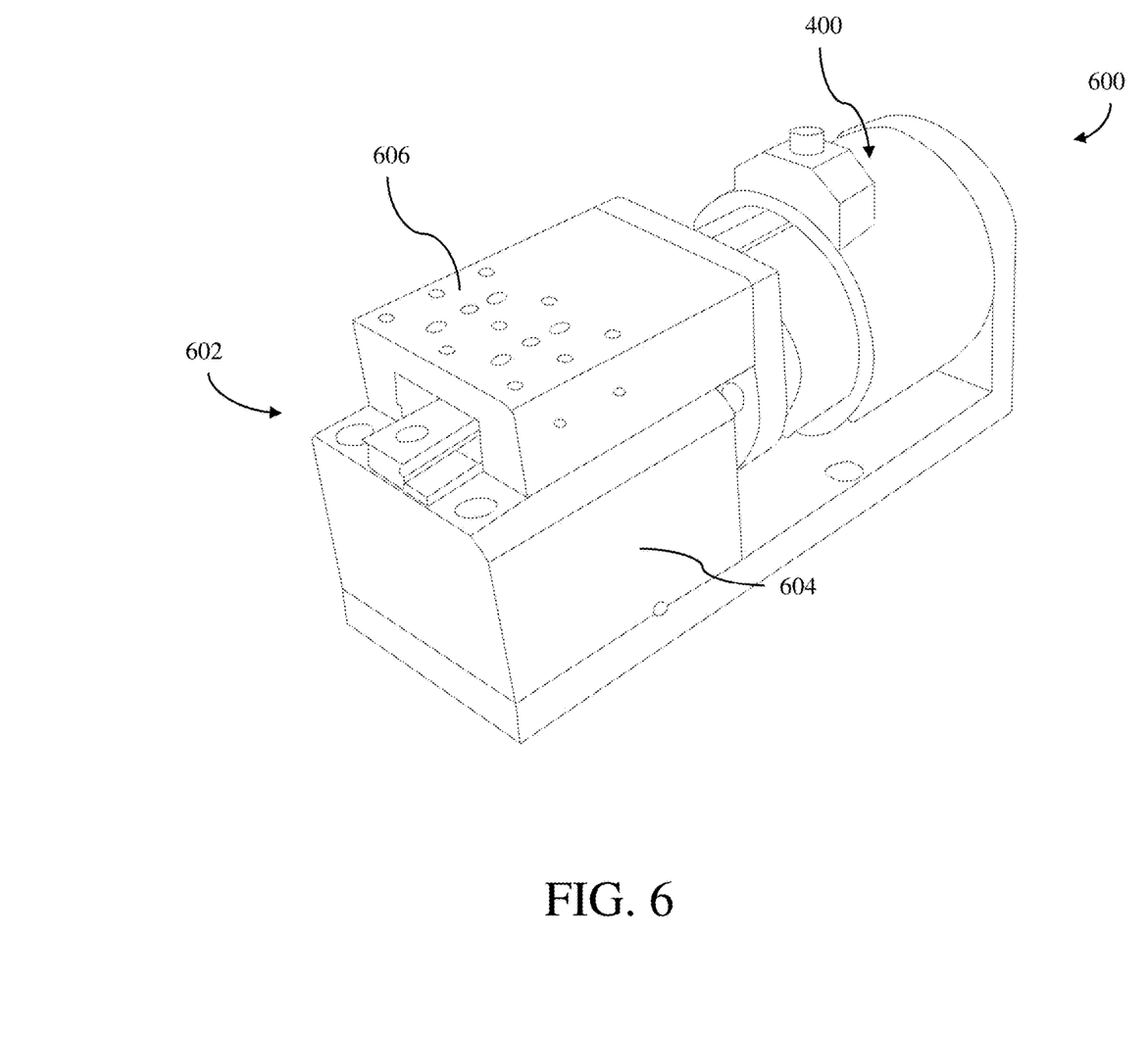
FIG. 6 is a diagram of a voice coil stage, which includes the linear voice coil motor shown in FIG. 4, in accordance with an embodiment of the invention.

Turning now to FIG. 6, a fully assembled voice coil stage 600 with the linear DC voice coil motor 400 in accordance with an embodiment of the invention is shown. The voice coil stage 600 includes a linear carriage system 602 with a stationary base 604 and a movable structure 606, which is connected to the coil assembly of the voice coil motor to be displaced.

The voice coil stage 600 has a footprint similar to the voice coil stage 200 without a linear encoder, as shown in FIG. 2. However, the voice coil stage 600 includes a linear encoder, i.e., the encoder reader 412 mounted to the outer housing 408 of the voice coil motor 400 and the encoder strip 416 attached to the coil 406 of the coil assembly 404 of the voice coil motor 400, as illustrated in FIG. 4. Thus, compared to the conventional voice coil stage 300, which includes a linear encoder, the voice coil stage 600 has a much smaller footprint, and consequently, is much smaller in overall size.

Figure 7:
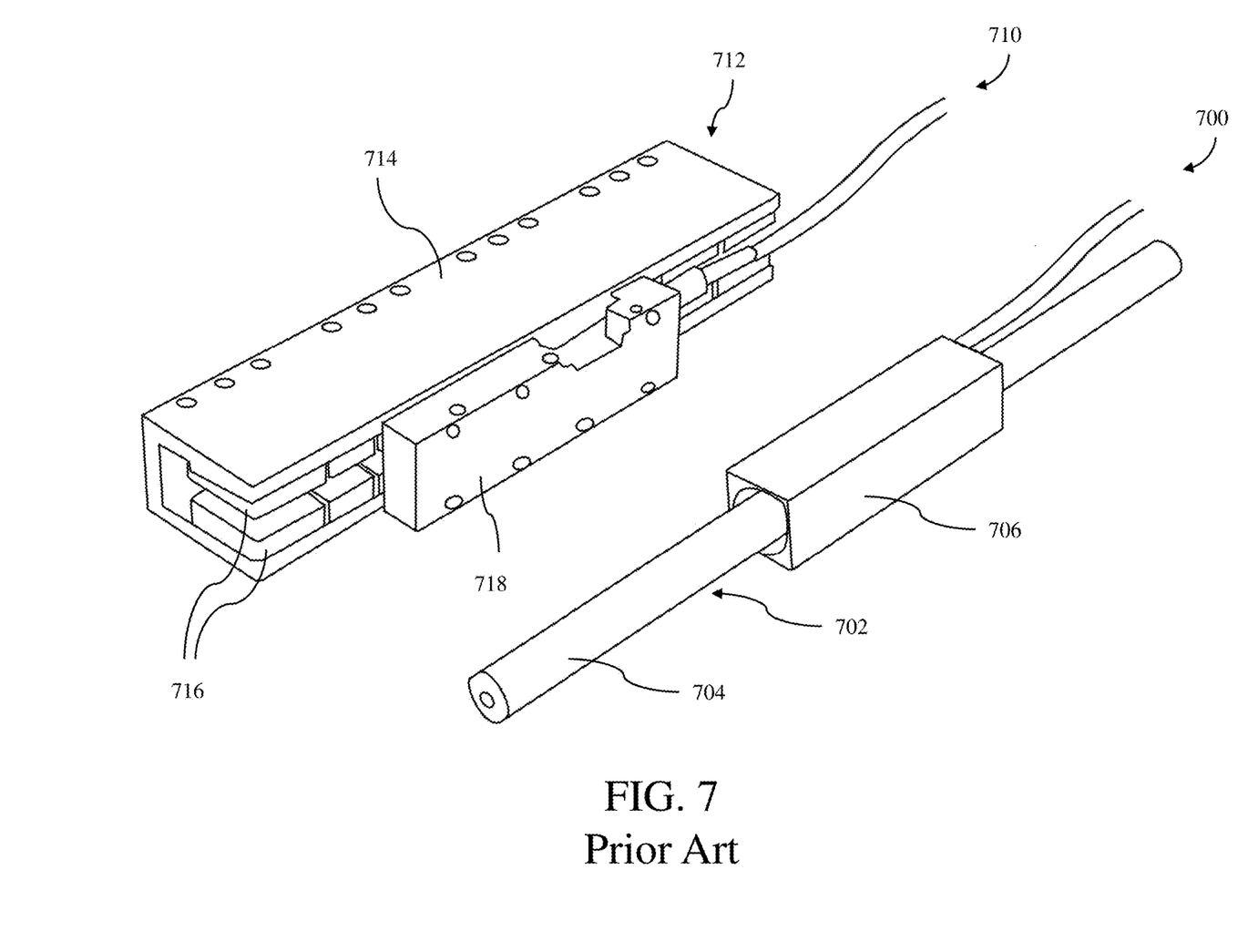
FIG. 7 is a diagram of a linear shaft motor and a U-channel linear motor in accordance with the prior art.

Similar integration technique used for the voice coil motor 400 may also be applied to other types of linear motors, such as linear shaft motors and U-channel linear motors. An example of a typical linear shaft motor 700 is illustrated in FIG. 7. The linear shaft motor 700 includes a magnetic shaft 702, which has one or more magnets (not illustrated), e.g., magnetic disks, placed inside a shaft housing 704, and a coil unit or assembly 706, also known as a forcer, which contain a coil (not illustrated). The coil assembly 706 is placed around the shaft 702 so that the shaft 702 is positioned within the coil of the coil assembly 706. The coil assembly 706 typically moves along the shaft 702 utilizing the magnetic disks in the shaft housing 704.

Figure 8:
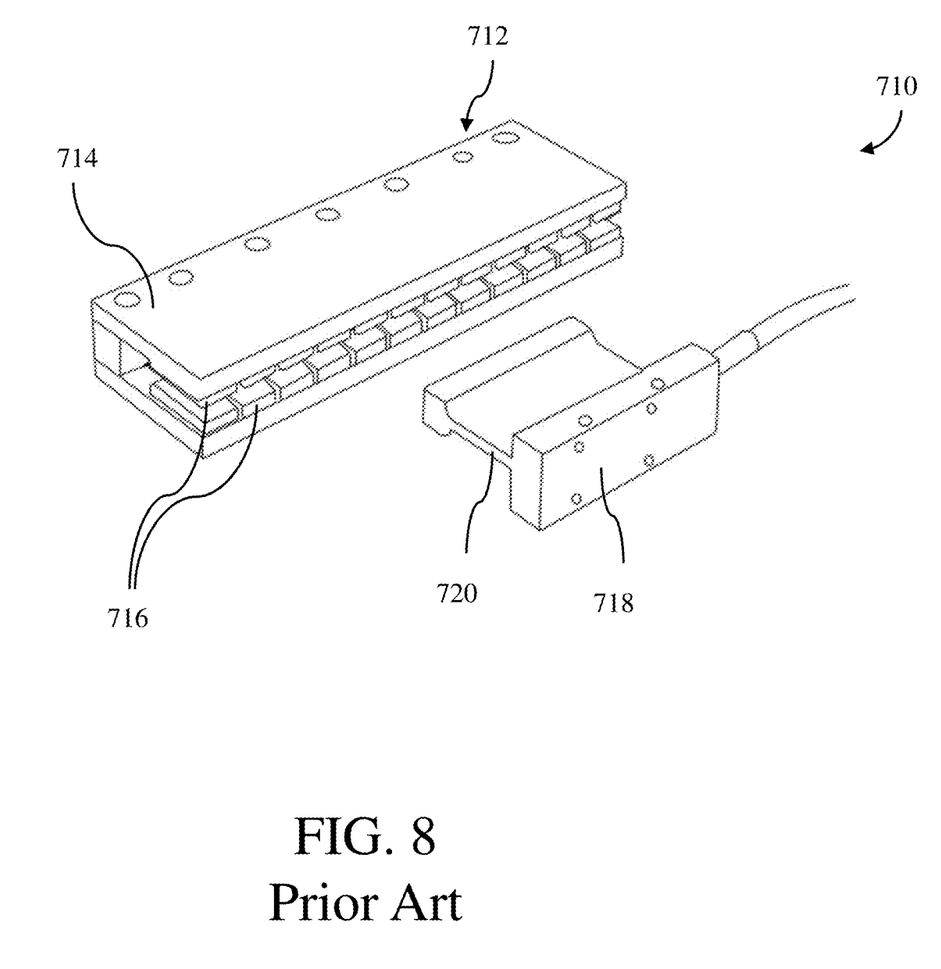
FIG. 8 is a diagram of the U-channel linear motor shown in FIG. 7, illustrating a U-channel magnetic assembly and a T-shaped forcer of the U-channel linear motor in accordance with the prior art.

Also illustrated in FIG. 7 is a typical U-channel linear motor 710, which has a U-shaped magnetic assembly 712 that includes a U-shaped support structure 714 with magnet tracks 716 on the inside sidewalls of the U-shaped support structure. The U-channel linear motor 710 also includes a T-shaped forcer 718 with multiple coils (not shown) in a stem portion 720, as better illustrated in FIG. 8. The forcer is positioned so that the coil is situated between the magnet tracks to move linearly along the magnet tracks.

Figure 9:
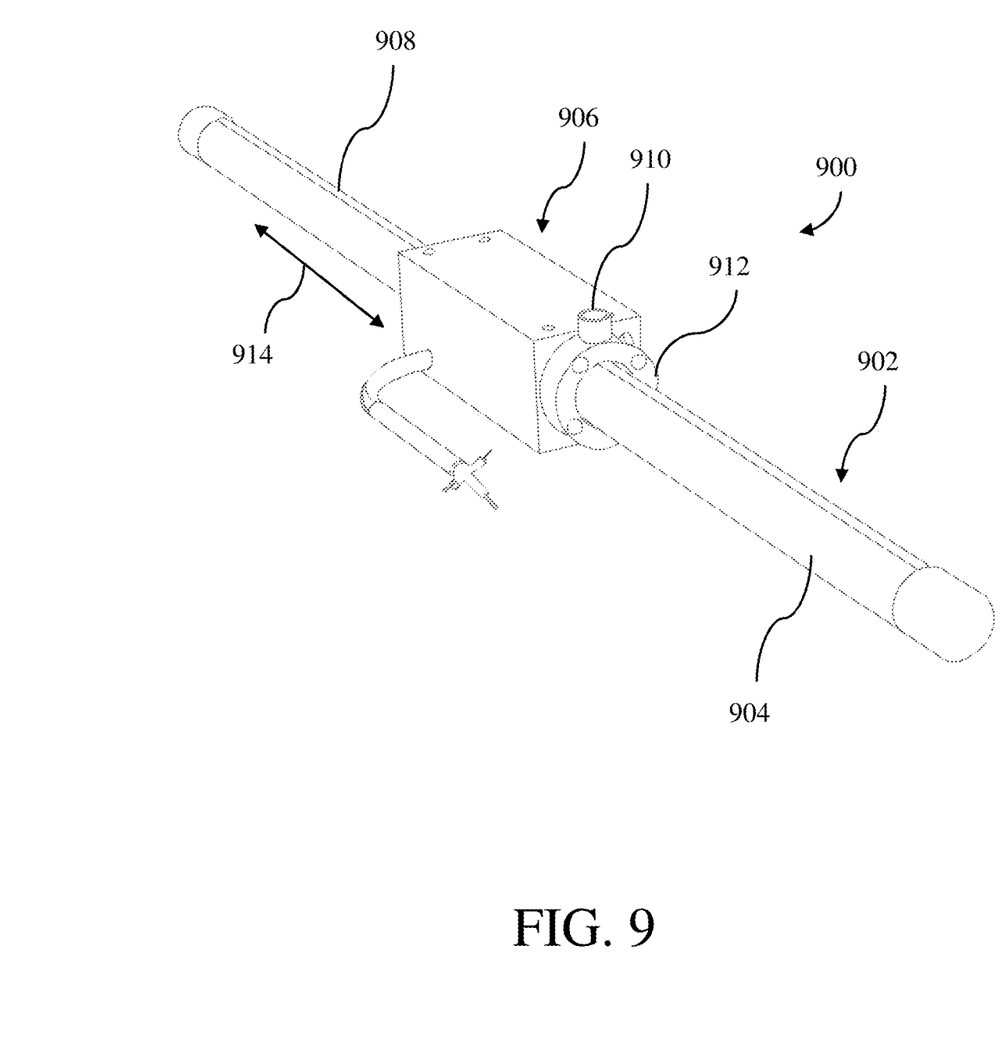
FIG. 9 is a diagram of a linear shaft motor with a linear encoder in accordance with an embodiment of the invention.

Turning now to FIG. 9, a linear shaft motor 900 in accordance with an embodiment of the invention is shown. Similar to the conventional linear shaft motor 700 shown in FIG. 7, the linear shaft motor 900 includes a magnetic shaft 902, which has one or more magnets (not illustrated), e.g., magnetic disks, placed inside a shaft housing 904, and a coil unit or assembly 906, also known as a forcer, which contains a coil (not illustrated). The coil assembly 906 is placed around the shaft 902 so that the shaft is positioned within the coil of the coil assembly 906. The coil assembly 906 typically moves along the shaft 902 utilizing the magnetic disks in the shaft housing 904.

In addition, as shown in FIG. 9, the linear shaft motor 900 has a linear encoder, which includes an encoder strip 908 attached to the shaft 902 in the lengthwise direction of the shaft 902 and an encoder reader 910 attached to the coil assembly 906. Specifically, the encoder strip 908 is placed along the shaft housing 904 of the shaft 902, which holds the magnetic disks. The encoder reader 910 is attached to the coil assembly 906 such that the encoder reader is positioned to read the encoder strip 908 on the shaft 902 as the coil assembly linearly travels along the shaft in the directions as indicated by the arrow 914. As illustrated in FIG. 9, the encoder reader 910 may be attached to the coil assembly 906 using an encoder reader bracket 912, which may be hollow-cylinder shaped. In the illustrated embodiment, the encoder reader 910 is affixed to the lateral surface of the encoder reader bracket 912.

The encoder reader 910 can be any type of an encoder reader, such as an optical or magnetic linear encoder reader. Thus, the encoder strip 908 on the shaft 902 may be a reflective encoder strip or a magnetic encoder strip, depending on the encoder reader type used in the linear shaft motor 900.

Figure 10:
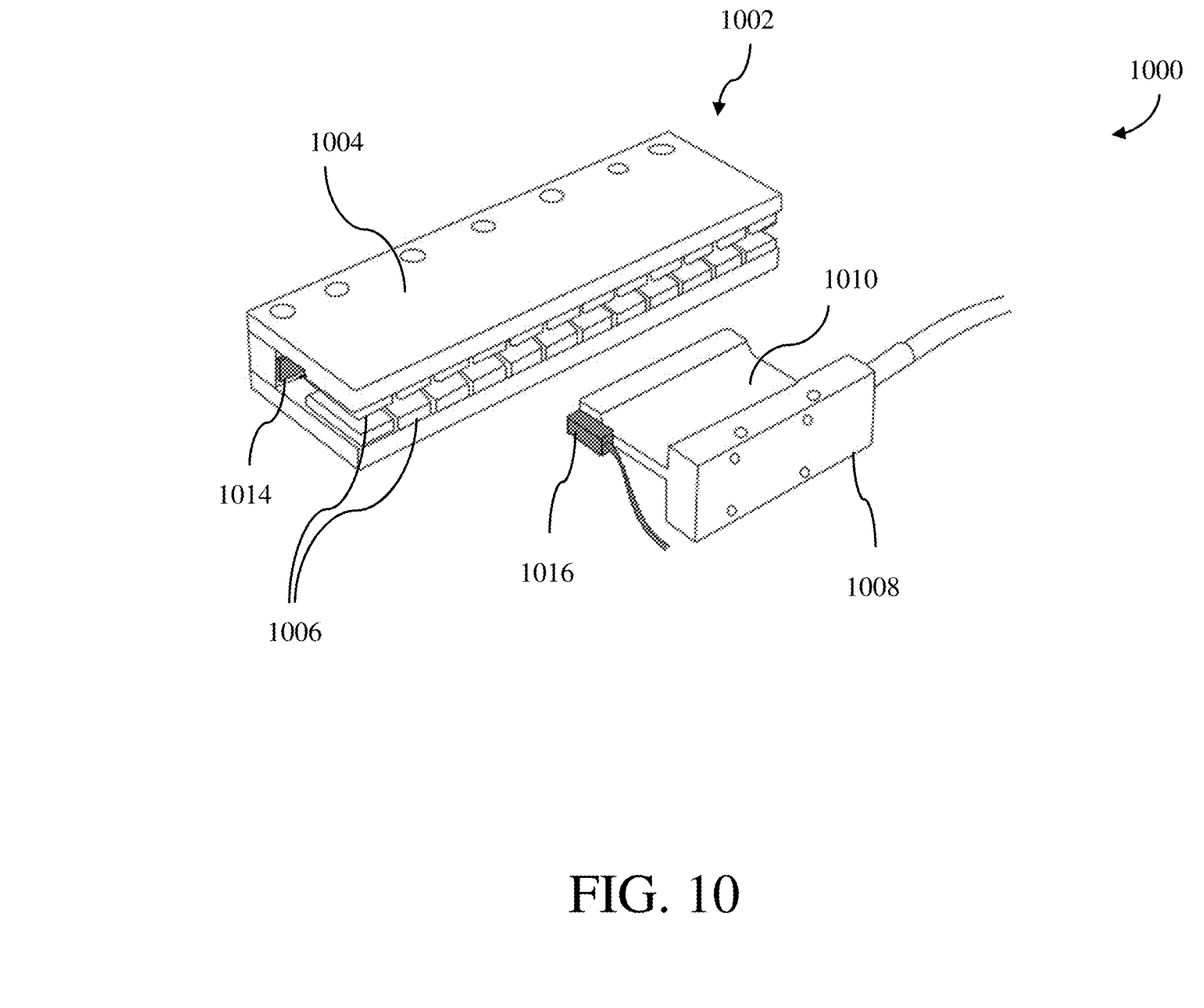
FIG. 10 is a diagram of a U-channel linear motor in accordance with an embodiment of the invention, illustrating a U-channel support structure with an encoder strip and a T-shaped forcer with an encoder reader of the U-channel linear motor.
Figure 11A:
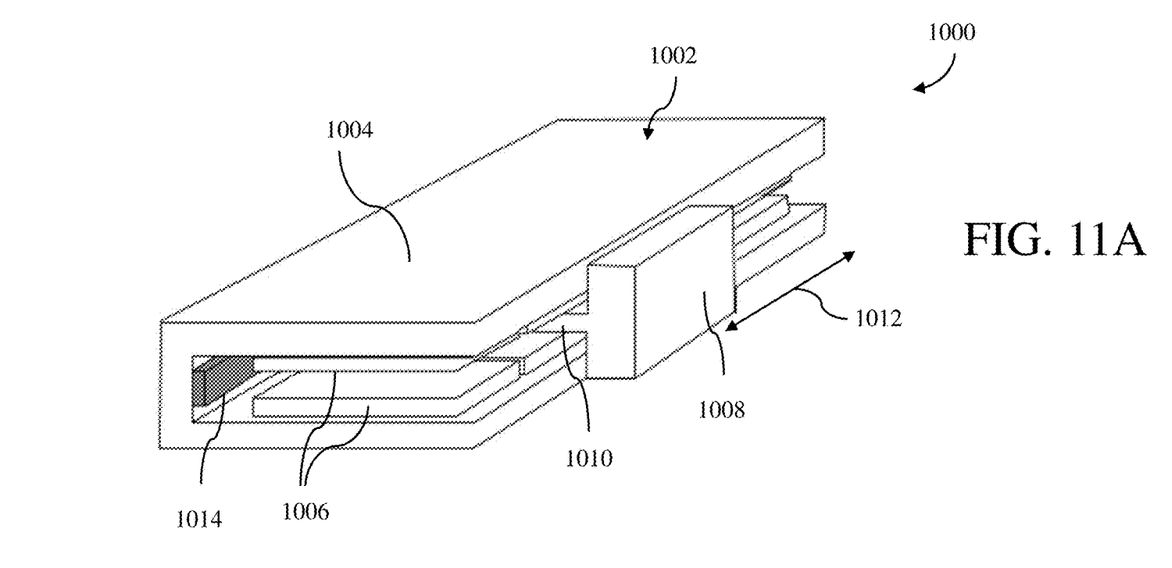
FIG. 11A shows a perspective view of the U-channel linear motor shown in FIG. 10 in accordance with an embodiment of the invention.
Figure 11B:
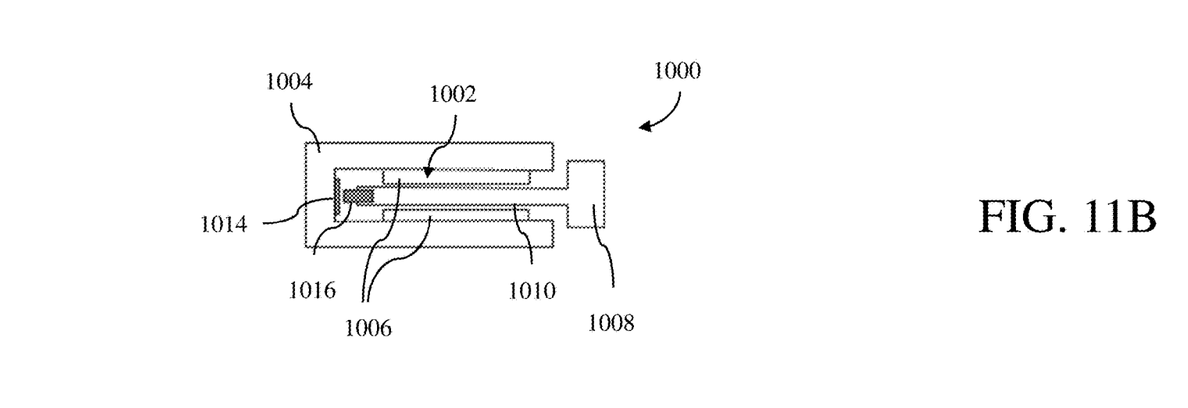
FIG. 11B shows a side view of the U-channel linear motor shown in FIG. 10 in accordance with an embodiment of the invention.

Turning now to FIGS. 10, 11A and 11B, a U-channel linear motor 1000 in accordance with an embodiment of the invention is shown. Similar to the conventional U-channel linear motor 710 shown in FIGS. 7 and 8, the U-channel linear motor 1000 has a magnetic assembly 1002 that includes a U-shaped support structure 1004 with magnet tracks 1006 on the inside sidewalls of the U-shaped support structure. The U-channel linear motor 1000 also includes a T-shaped forcer 1008 with multiple coils (not shown) in a stem portion 1010, as best illustrated in FIGS. 10 and 11B. The T-shaped forcer 1008 is positioned so that the coils are situated between the magnet tracks 1006 to move linearly along the magnet tracks in the directions as indicated by the arrow 1012.

In addition, as shown in FIGS. 10, 11A and 11B, U-channel linear motor 1000 has a linear encoder, which includes an encoder strip 1014 and an encoder reader 1016. The encoder strip 1014 is attached to the inside bottom surface of the U-shaped support structure 1004, i.e., the inside surface of the U-shaped support structure between the inside sidewalls with the magnet tracks 1006. The encoder reader 1016 is attached to the stem portion 1010 of the T-shaped forcer 1008 to read the encoder strip 1014 as the T-shaped forcer 1008 travels along between the two magnetic tracks 1006 on both of the inside sidewalls of the U-shaped support structure 1004. As illustrated in FIGS. 10 and 11B, the encoder reader 1016 may be attached to a surface of the stem portion 1010 of the T-shaped forcer 1008 that does not face the magnet tracks 1006 on both of the inside sidewalls of the U-shaped support structure 1004.

The encoder reader 1016 can be any type of an encoder reader, such as an optical or magnetic linear encoder reader. Thus, the encoder strip 1014 on the inside bottom surface of the U-shaped support structure 1004 may be a reflective encoder strip or a magnetic encoder strip, depending on the encoder reader type used in the U-channel linear motor 1000.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A linear motor comprising:
a magnetic assembly;
a coil assembly having at least one coil positioned to magnetically engage the magnetic assembly for linear displacement between the magnetic assembly and the coil assembly;
an encoder strip attached to one of the magnetic assembly and the coil assembly; and
an encoder reader attached to the other one of the magnetic assembly and the coil assembly to read the encoder strip during the linear displacement between the magnetic assembly and the coil assembly,
wherein the magnetic assembly and the coil assembly are parts of a voice coil motor, wherein the encoder reader is attached to an outer housing of the magnetic assembly, and wherein the encoder strip is attached to a coil of the coil assembly, the outer housing of the magnetic assembly being connected to a magnet structure that is positioned within the coil of the coil assembly.

2. The linear motor of claim 1, wherein the outer housing of the magnetic assembly of the voice coil motor includes an opening for the encoder reader to read the encoder strip through the outer housing of the magnetic assembly.

3. The linear motor of claim 1, wherein the encoder reader is an optical encoder reader.

4. The linear motor of claim 3, wherein the encoder strip includes grating or lines.

5. The linear motor of claim 1, wherein the encoder reader is a magnetic encoder reader.

6. The linear motor of claim 5, wherein the encoder strip includes alternating sections of north (N) and south (S) poles.

7. A linear voice coil motor comprising:
a stationary magnetic assembly;
a coil assembly having at least one coil positioned to magnetically engage the stationary magnetic assembly for linear displacement of the coil assembly relative to the stationary magnetic assembly;
an encoder strip attached to the coil assembly; and
an encoder reader attached to the stationary magnetic assembly to read the encoder strip when the coil assembly is linearly displaced,
wherein the encoder reader is attached to an outer surface of an outer housing of the magnetic assembly, and wherein the encoder strip is attached to an outer surface of a coil of the coil assembly, the outer housing of the magnetic assembly being connected to a magnet structure that is positioned within the coil of the coil assembly.

8. The linear voice coil motor of claim 7, wherein the outer housing of the magnetic assembly of the voice coil motor includes an opening for the encoder reader to read the encoder strip through the outer housing of the magnetic assembly.

* * * * *